Dec. 5, 1933.  J. B. TAYLOR  1,937,923
AUTO SLED
Filed Nov. 11, 1931   4 Sheets-Sheet 1
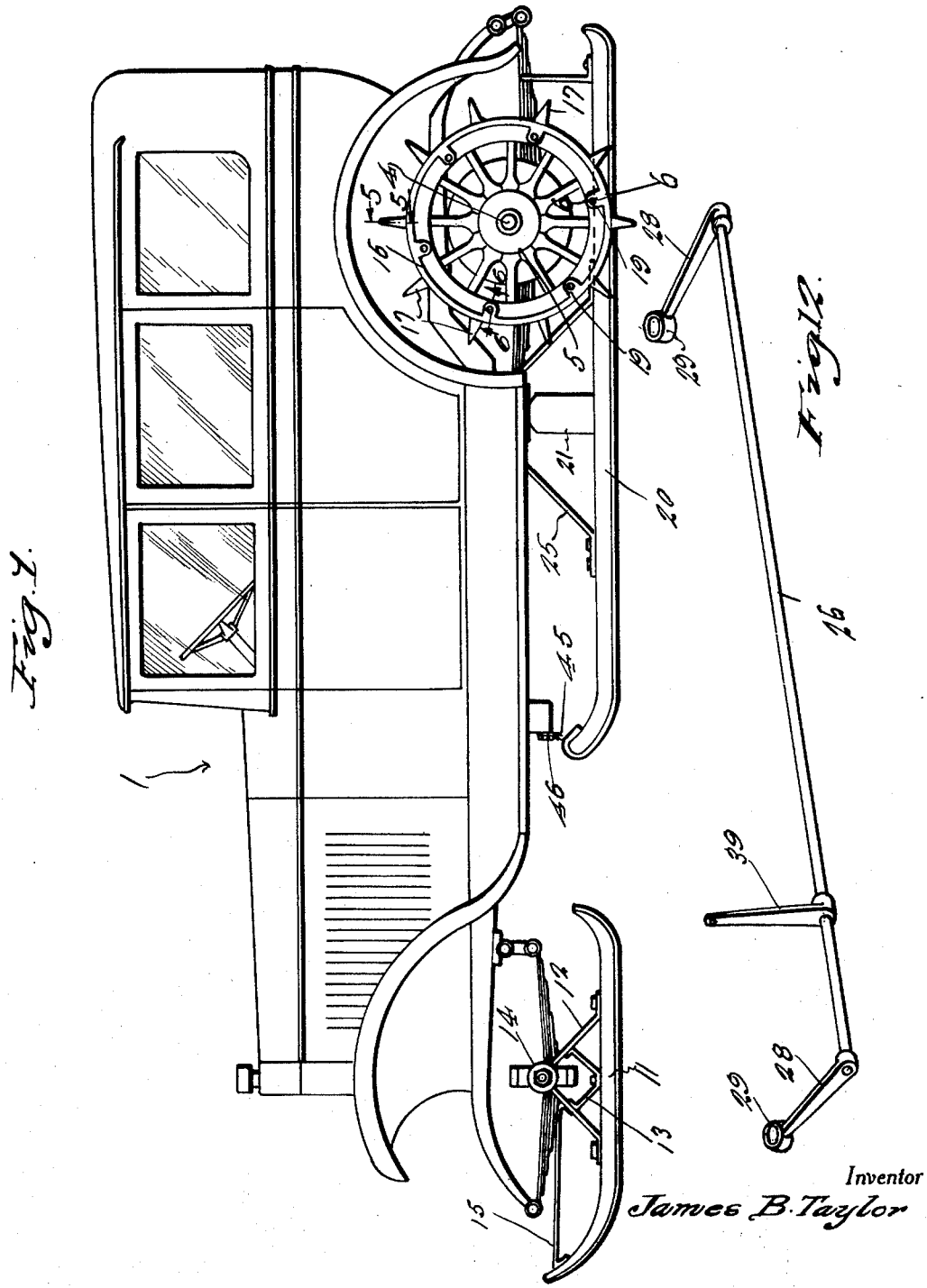
Inventor
James B. Taylor

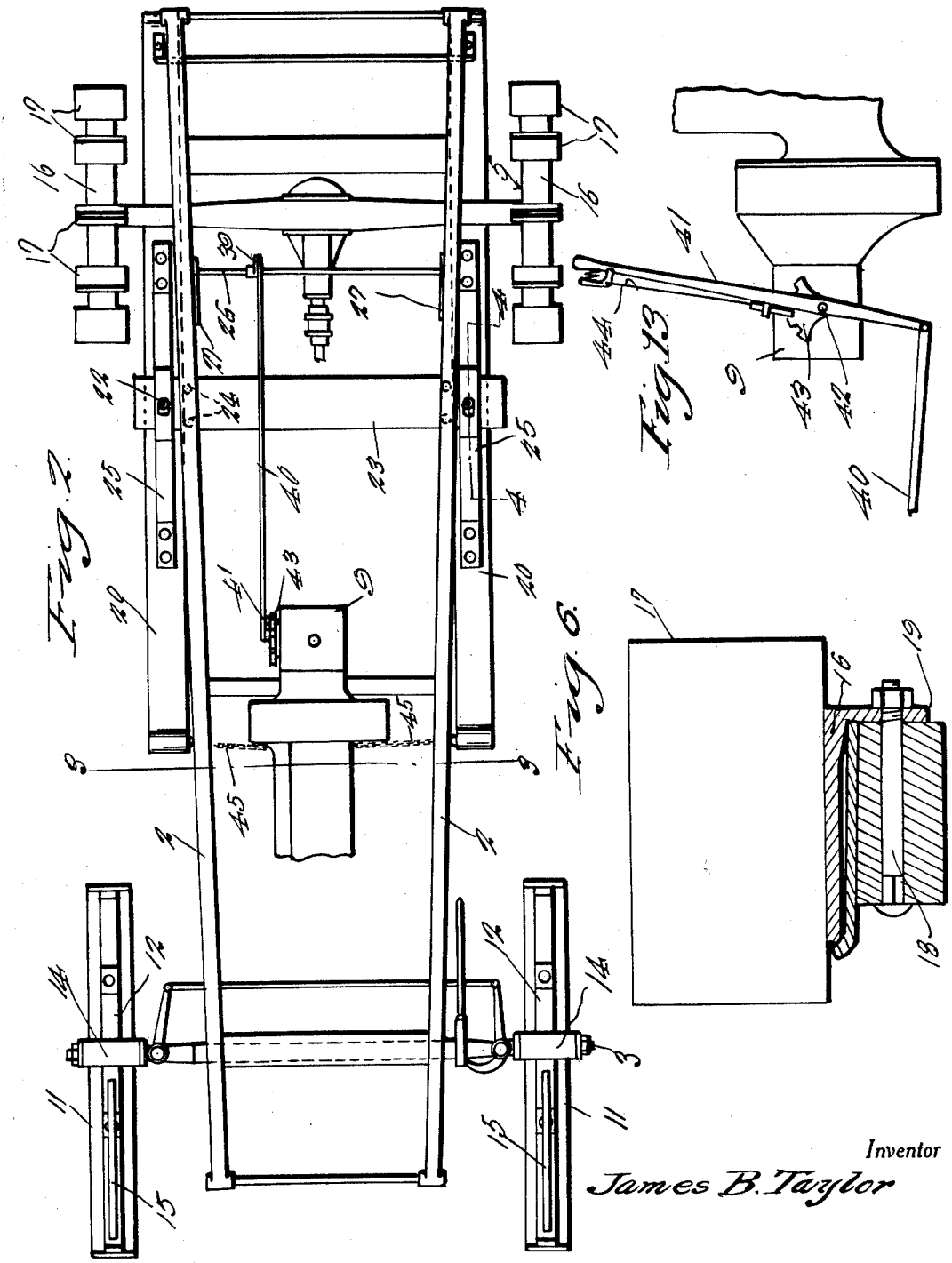

Dec. 5, 1933.  J. B. TAYLOR  1,937,923
AUTO SLED
Filed Nov. 11, 1931   4 Sheets-Sheet 3
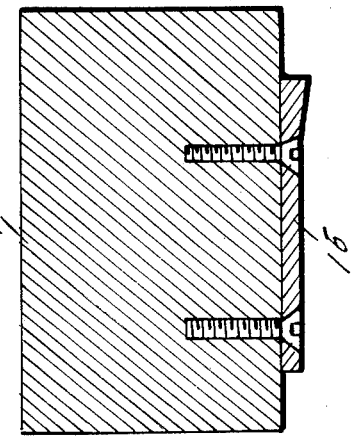
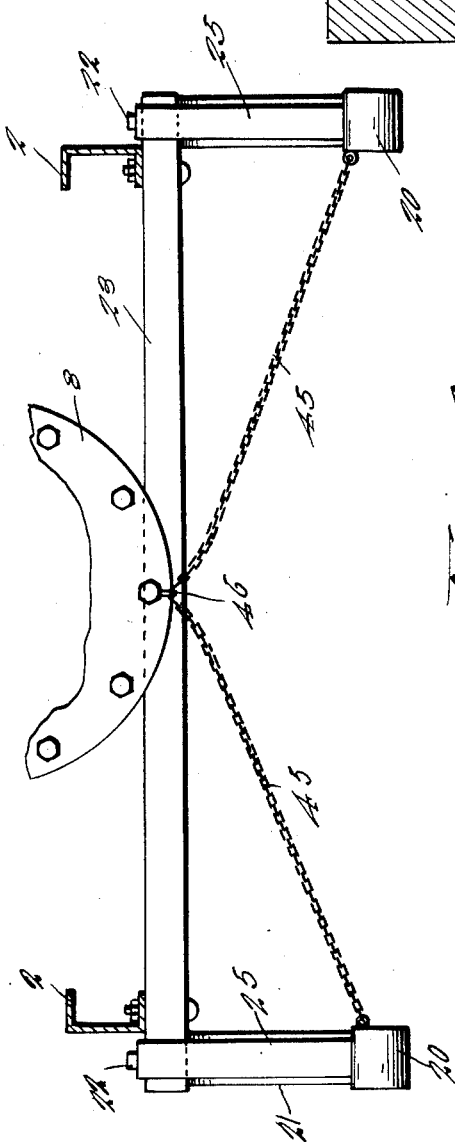
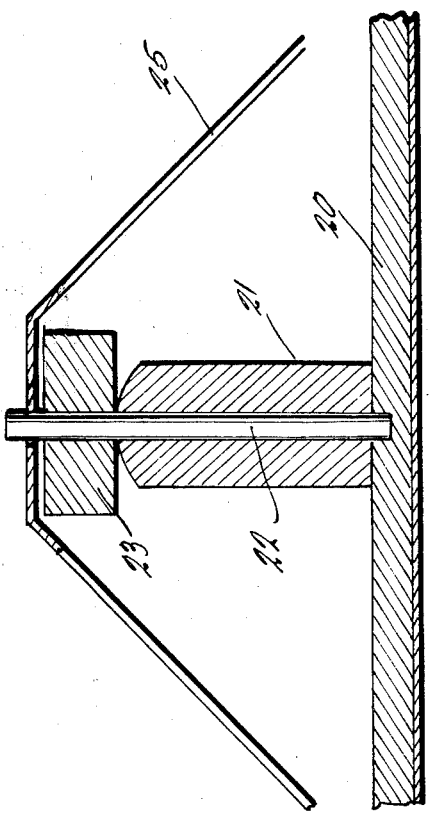
Inventor
James B. Taylor
By Clarence A. O'Brien
Attorney Dec. 5, 1933.  J. B. TAYLOR  1,937,923
AUTO SLED
Filed Nov. 11, 1931   4 Sheets-Sheet 4
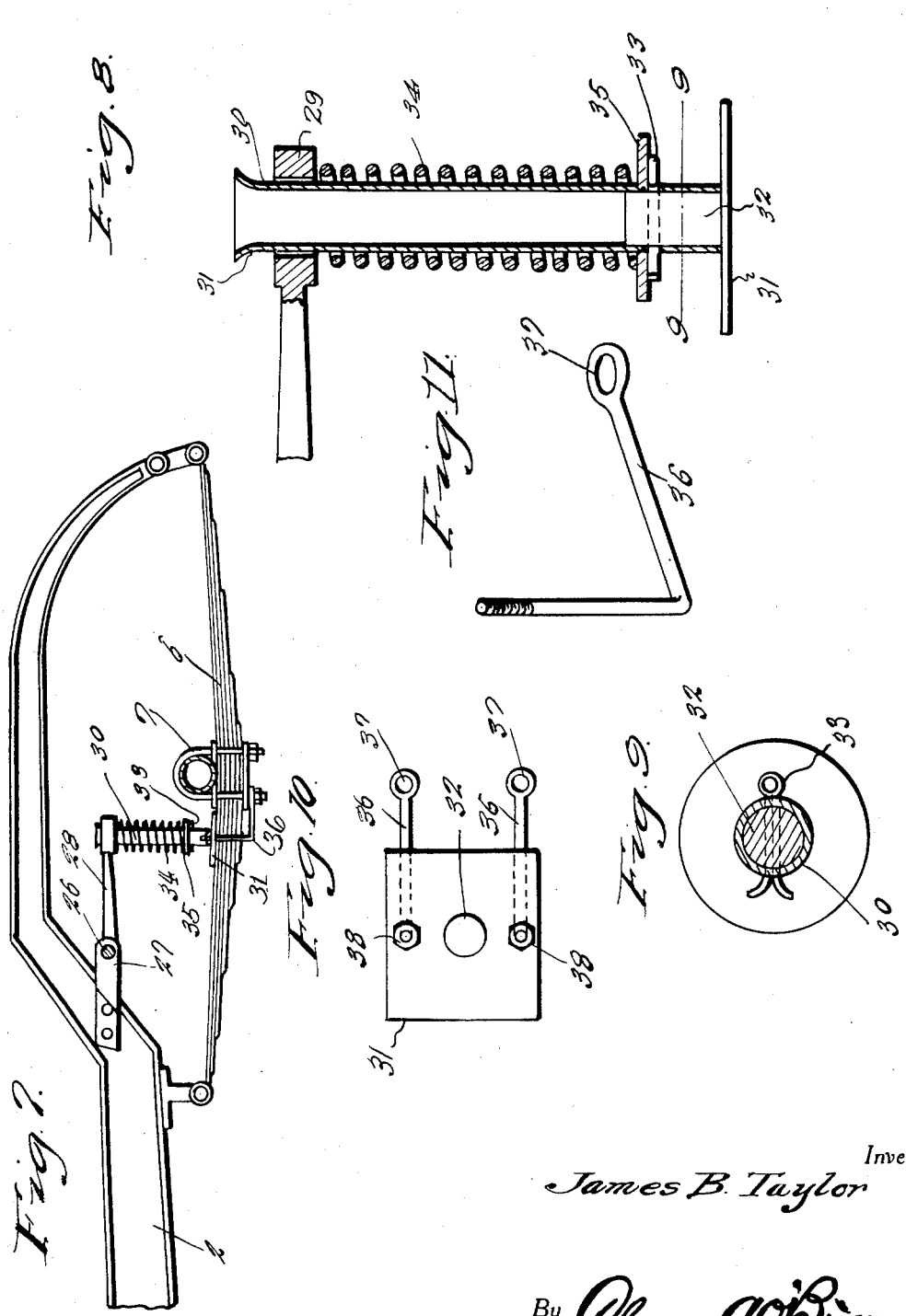
Inventor
James B. Taylor
By Clarence A. O'Brien
Attorney Patented Dec. 5, 1933

1,937,923

UNITED STATES PATENT OFFICE 1,937,923

AUTO SLED

James B. Taylor, Arco, Idaho

Application November 11, 1931
Serial No. 574,396

2 Claims. (Cl. 180—6)

The object of this invention is to convert a conventional type of automobile into what may be termed a motor driven sled, the invention comprehending the provision of traction means in lieu of wheels whereby the vehicle will be capable of movement over the ground in the same manner as a sled.

According to the present invention, for the usual front wheels of the automobile there is substituted runners with additional runners provided rearwardly of the automobile, together with having the rear wheels of the automobile equipped with traction lugs instead of tires, the lug wheels affording means for "purchase" and to be used, when the automobile is travelling at any desired speed.

A still further object of the invention is to provide means whereby the traction wheels may be raised and lowered relative to the ground.

Other objects and advantages of the invention will become apparent from a study of the following description, taken in connection with the accompanying drawings wherein:

Figure 1 is a side elevational view of said sled.

Figure 2 is a plan view, the body of the vehicle being removed.

Figures 3 and 4 are sectional elevational views taken substantially on the lines 3—3, and 4—4 respectively of Figure 2.

Figures 5 and 6 are sectional views taken substantially on the lines 5—5 and 6—6 respectively of Figure 1.

Figure 7 is a fragmentary sectional elevational view showing the resilient connection between a rocker arm and spring of the automobile such part forming a portion of the means for raising and lowering the rear axle of the automobile with respect to the ground.

Figure 8 is a longitudinal sectional elevational view taken through the post shown in Figure 7.

Figure 9 is a transverse sectional view taken substantially on the line 9—9 of Figure 8 and looking upwardly.

Figure 10 is a plan view of the post supporting plate, and the bolts used in anchoring the plate on the vehicle spring.

Figure 11 is a perspective view of one of the anchoring bolts.

Figure 12 is a perspective view of the rock shaft.

Figure 13 is a fragmentary side elevational view illustrating the manner of supporting the control lever and the means for securing the same at the desired adjustment.

With reference more in detail to the drawings, it will be seen that 1 indicates generally a conventional type of automobile, the same, including among other parts those parts with which the present invention is particularly concerned, namely the chassis bars 2, front axle 3, rear axle 4, rear wheels 5, rear springs 6 and clamping bolts 7 associated therewith, clutch housing 8 and transmission case 9.

According to the present invention, the front wheels of the automobile are removed, and substituted therefor are runners 11 which may be of any suitable construction, being preferably constructed of a wood body having curved ends and a tread strap secured to the body.

Rising from each runner is a bracket 12 braced as at 13 and provided at its upper end with a hub 14 suitably mounted on an end of the front axle 3. The bracket 12 is also braced with respect to the runner 11 through the medium of a horizontal brace rod 15.

In using the wheels 5, the pneumatic tires are dispensed with and substituted therefor is a rim 16 provided with suitable traction lugs 17, the rim being secured in position on the wheel through the medium of felly bolts 18 and apertured lugs 19 integral with the rim 16, (see Figure 6).

The rear of the automobile is also supported by relatively long runners 20. These runners 20 may be constructed in any manner desired but preferably consists of a body of hard wood, curved at the ends of the runners and having a tread cap or plate suitably secured thereto.

Each runner 20 has rising from an intermediate portion thereof, what may be termed a "bunker", the same comprising a relatively short vertical post 21 through which extends a vertical rod 22 the lower end of which is suitably fixed to the runner. The upper end of the post 21 is preferably convexed as shown in Figure 4. The runners 20 are connected by a cross bar 23 that is bolted or otherwise secured to the chassis bars 2 as at 24 forwardly of the rear axle of the automobile. The rods 22 at their upper ends extend through suitable apertures provided therefor in the ends of cross bars 23, each rod 22 is braced with respect to its runner through the medium of its substantially inverted V-shaped brace 25 which at is truncated apex is apertured for receiving the apertured end of the rod 22.

The diverging portions of the brace 25 at the free ends thereof are suitably bolted or otherwise secured to the runner.

A rock shaft 26 extends transversely of the automobile and has its ends journalled in bracket arms 27 bolted or otherwise secured to the chassis bars 22. At each end thereof the rock shaft 26 is provided with an arm 28 that at its free end is equipped with a collar 29. The collar 29 of each arm 28 is slidably engaged with a post or tube 30 that is vertically disposed, and which at its upper end is provided with a flared portion 31 to prevent disengagement of the sleeve or collar 29 with the post.

Each post 30 is tubular, and is supported on a base plate 31 that is equipped with a relatively short pin 32 extending upwardly within the lower end of the tube or post 30. The tube or post 30 is anchored to the pin 32 through the medium of a cotter pin 33. Disposed about the tube or post 30 is a coil spring 34 the upper end of which bears against the sleeve 29, and the lower end of which bears against a washer 35 that is normally urged against the cotter pin 33.

Each rear vehicle spring 6 has a plate 31 resting thereon, and the plate is secured in position, through the medium of angular tie bolts 36, the tie bolts having eyes 37 on their horizontal portions engaged with the U-bolts 7 usually provided in the devices used for securing intermediate portions of the spring 6 to the rear axle housing. The vertical portions of the bolts 36 extend through apertures in the plate 31 and have nuts 37 threaded with the free end of the bolts.

Preferably, there is provided two of such bolts 36 for anchoring the plate 31 in position, the bolts being disposed on relatively opposite sides of the spring 6, so that the plate 31 is held against displacement relative to the springs laterally or longitudinally.

The rock shaft 26 is also provided with an arm 39 to which is connected one end of a control rod 40, the other end of the rod 40 being connected to a control lever 41 that is pivotally mounted as at 42 on the transmission case 9. Also suitably mounted on the transmission case is a ratchet segment 43 and the lever 41 is provided with a detent structure 44 cooperable with the segment 43 for securing the lever 41 in desirable adjustment.

On cars or trucks weighing 3000 lbs. or over, double action hydraulic lift and lowering device of suitable design will be used between arm 39 and lever 41, as the mechanical lift would not have leverage or power enough to raise the differential assembly including springs and traction wheels on the heavier cars or trucks.

Obviously, by rocking the lever 41 movement of the lever will be transmitted to the shaft 26 for raising and lowering the rear springs of the automobile so that the relation of the traction lug equipped wheels 5 with respect to the ground may be varied and regulated in accordance with the conditions encountered. That is to say, through adjustment of the lever 41 the wheels 5 may be adjusted with respect to the ground to bring about proper contact of the wheels with the snow to afford the necessary driving traction.

In actual practice, it will be necessary to so adjust the lug equipped wheels as to sink into the snow to a considerable depth at such times as the automobile may be in low gear as when starting, or ascending a steep grade. When the vehicle is in high gear, the traction wheels may be raised so that the same sink into the snow only to such an extent as to afford sufficient driving traction.

The forward ends of the runners 20 are connected together through the medium of a chain 45 secured at its ends to the forward end of the runners and anchored intermediate its ends as at 46 to the clutch housing 8.

Preferably the rear runners 20 are so placed as to support substantially two-thirds of the weight of the car so that the front runners bearing a minimum amount of the weight may be easily actuated for steering purposes. It is also to be noted that the front runners are placed in line with the rear wheel of the vehicle and thus serve to pack loose snow aiding in increasing the traction power of the rear wheels.

In providing the spring 34, provision is made for absorbing all such shocks as may be occasioned by the lugs encountering hard objects in the snow or road bed.

From the foregoing it will be apparent that owing to the present invention, a conventional type of automobile may be readily converted to a self propelled sled thus increasing the utility of the automobile in snow covered territory.

Even though I have herein shown and described the preferred embodiment of the invention, it is to be understood that the same is susceptible of further changes, modifications and improvements coming within the scope of the appended claims.

Having thus described my invention, what I claim as new is:

1. A self propelled vehicle including in combination a rear axle, rear springs, lug equipped wheels mounted on the axle, runners supporting the vehicle forwardly of said rear axle, a rock shaft mounted transversely of the vehicle, posts rising from the rear springs of the vehicle, and arms on said rock shaft provided with sleeves slidably embracing said posts, means for rocking said shaft whereby to raise and lower the rear axle of the vehicle relative to the ground, and means for retaining said rock shaft in various adjusted positions.

2. An automobile including in combination a rear axle, rear springs, lug equipped wheels on said axle, a fixed bar extending transversely of the automobile forwardly of said rear axle, oppositely disposed runners, each of said runners being connected intermediate its ends to an adjacent end of said bar, a transverse rock shaft mounted forwardly of the rear axle of the automobile, rocker arms on said shaft, and means connecting said arms with the rear springs of the automobile whereupon by rocking movement of said shaft, the rear axle may be raised and lowered relative to the ground for adjusting said wheels with respect to the ground, remote control means for rocking said shaft, and means for retaining said rock shaft in various adjusted positions.

JAMES B. TAYLOR.